(12) United States Patent
Schmitz

(10) Patent No.: US 9,631,775 B2
(45) Date of Patent: Apr. 25, 2017

(54) TAP FOR A GAS CYLINDER HAVING A VISUAL PRESSURE INDICATOR

(71) Applicant: Luxembourg Patent Company S.A., Lintgen (LU)

(72) Inventor: Jean-Claude Schmitz, Heisdorf (LU)

(73) Assignee: Luxembourg Patent Company S.A., Luxembourg (LU)

( * ) Notice: Subject to any disclaimer, the term of this patent is extended or adjusted under 35 U.S.C. 154(b) by 82 days.

(21) Appl. No.: 14/379,340

(22) PCT Filed: Feb. 28, 2013

(86) PCT No.: PCT/EP2013/053990
§ 371 (c)(1),
(2) Date: Aug. 18, 2014

(87) PCT Pub. No.: WO2013/127895
PCT Pub. Date: Sep. 6, 2013

(65) Prior Publication Data
US 2015/0034184 A1    Feb. 5, 2015

(30) Foreign Application Priority Data
Mar. 1, 2012  (LU) .......................................... 91948

(51) Int. Cl.
*F17C 13/02*    (2006.01)
*G01L 19/10*   (2006.01)
*F17C 13/04*    (2006.01)

(52) U.S. Cl.
CPC ............ *F17C 13/025* (2013.01); *F17C 13/04* (2013.01); *G01L 19/10* (2013.01);
(Continued)

(58) Field of Classification Search
CPC ........ F17C 2205/0344; F17C 2201/056; F17C 2260/036; F17C 2250/043;
(Continued)

(56) References Cited

U.S. PATENT DOCUMENTS 4,203,316 A * 5/1980 Jones .................. G01F 25/0007
                                                                        73/1.25
4,246,797 A * 1/1981 Myles ....................... G01L 7/16
                                                                        73/744
(Continued)

FOREIGN PATENT DOCUMENTS

GB     1187926 A     4/1970
WO   2007128887 A1  11/2007

OTHER PUBLICATIONS

Machine Translation of WO2007/128887 to Bassinot, Jean-Francois, et al. (Retrieved Feb. 3, 2016).*
(Continued)

*Primary Examiner* — Michael R Reid
(74) *Attorney, Agent, or Firm* — Polster Lieder

(57) ABSTRACT

The invention relates to a device for controlling the flow and/or pressure of a pressurized gas, and specifically to a tap for a pressurized-gas cylinder. The tap includes a body having a gas inlet, a gas outlet, and a passage connecting the inlet to the outlet. The tap also includes a valve for closing the passage, as well as a pressure indicator downstream from the closing valve. The pressure indicator is translatably operated and includes just two stable positions, i.e. one that corresponds to the presence of pressure, and the other to the absence of pressure.

18 Claims, 2 Drawing Sheets

(52) U.S. Cl.
CPC .. *F17C 2201/056* (2013.01); *F17C 2201/058* (2013.01); *F17C 2205/0329* (2013.01); *F17C 2205/0344* (2013.01); *F17C 2205/0385* (2013.01); *F17C 2223/0123* (2013.01); *F17C 2250/043* (2013.01); *F17C 2250/0491* (2013.01); *F17C 2250/075* (2013.01); *F17C 2260/036* (2013.01); *Y10T 137/794* (2015.04); *Y10T 137/8326* (2015.04)

(58) Field of Classification Search
CPC ........ F17C 2250/075; F17C 2205/0385; F17C 2223/0123; F17C 2201/058; F17C 2205/0329; F17C 13/025; F17C 13/04; G05D 7/0126; G05D 16/10; G01L 19/10; Y10T 137/794; Y10T 137/8326
USPC ............................................ 137/557; 73/744
See application file for complete search history.

(56) References Cited

U.S. PATENT DOCUMENTS

| | | |
|---|---|---|
| 5,014,786 A | 5/1991 | Kobayashi |
| 5,189,979 A | 3/1993 | Popenoe |
| 6,592,827 B1 * | 7/2003 | Zilker, Jr. .............. B01J 8/1809 251/129.01 |
| 2005/0016284 A1 | 1/2005 | Bernhard |
| 2005/0229981 A1 | 10/2005 | Frederiksen |
| 2011/0127350 A1 | 6/2011 | Beisssel et al. |

OTHER PUBLICATIONS

Written Opinion from corresponding International Application No. PCT/EP2013/053990, dated Sep. 2, 2014.
International Search Report from corresponding International Application No. PCT/EP2013/053990, mailed Apr. 22, 2013.

* cited by examiner

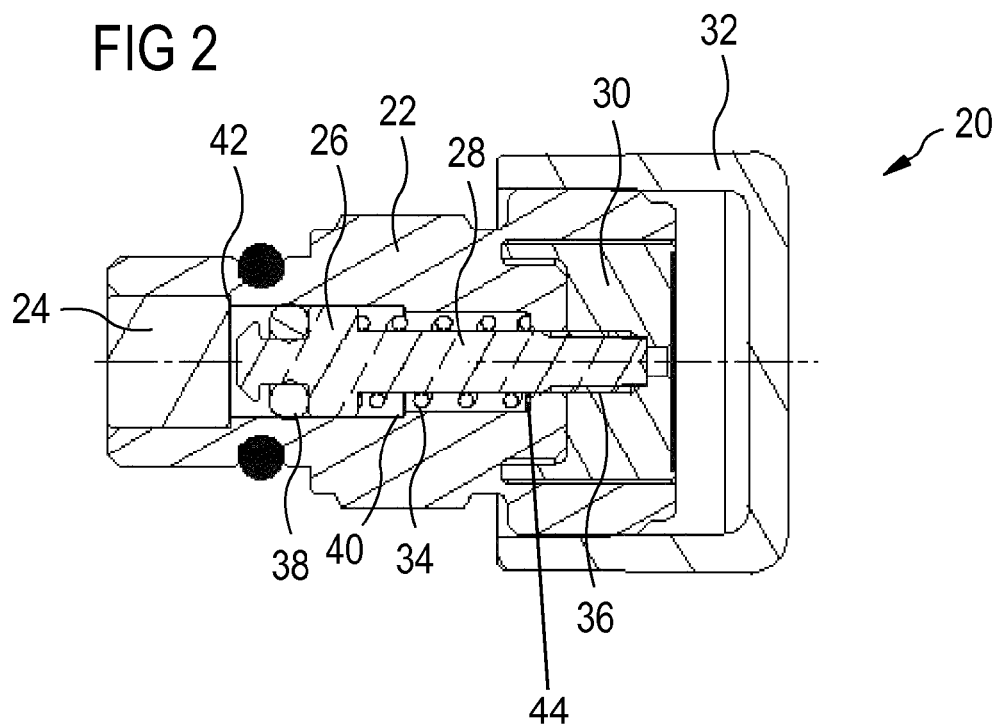
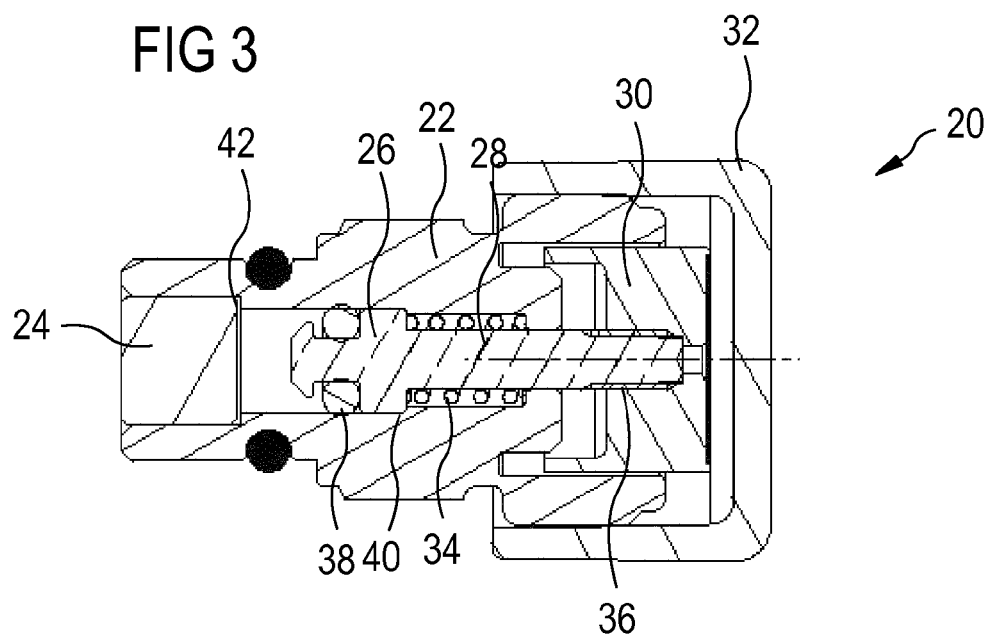

TAP FOR A GAS CYLINDER HAVING A VISUAL PRESSURE INDICATOR

CROSS-REFERENCE TO RELATED APPLICATIONS

The present invention is the US national stage under 35 U.S.C. §371 of International Application No. PCT/EP2013/053990, which was filed on Feb. 28, 2013, and which claims the priority of application LU 91948 filed on Mar. 1, 2012 the content of which (text, drawings and claims) are incorporated here by reference in its entirety.

FIELD

The invention relates to a device for controlling flow and/or pressure of pressurized gas, the device being provided with a shut-off valve. More particularly, the invention relates to a device for controlling flow and/or pressure of pressurized gas, with a shut-off valve and an indicator of the presence of pressure downstream of the shut-off valve.

BACKGROUND

The patent document US2005/0229981A1 discloses a tap for a pressurized gas cylinder comprising a valve with a control wheel and a pressure gauge mounted in the wheel and the control shaft of the valve. The pressure gauge is hydraulically downstream of the valve seat. It essentially comprises a sliding member with a piston housed in a cylinder, and a visual rotary member coupled to the sliding member. One face of the piston is subjected to fluid pressure downstream of the valve. The opposite face is subject to the resilient force of a spring. A rod extending from the piston comprises helical tracks cooperating with a corresponding orifice of the rotary element display, so as to convert the sliding movement of the piston and the rod into a rotary movement of the visual rotary member. The sliding member can take an infinite number of positions along the sliding stroke combined with defined angular positions, the latter corresponding to the angular positions of the visual rotary member. This indicating device is in fact a pressure gauge aiming to replace conventional gauges including shows gauges. The latter are indeed subject to deterioration when subject to impacts, especially when the cylinder falls down, this deterioration can be a source of leakage and hence a source of danger especially for gas under very high pressure and of dangerous nature. The pressure gauge of this teaching is also presented as being able to withstand pressures that are a multiple of its normal range of pressure. This pressure gauge is however of a somewhat complex design in particular in the mechanical connection between the rod and the visual rotary member as well as at the level of the guiding of the visual rotary member. Indeed, it must be supported so as to limit the friction forces, and more particularly in order to avoid blockages. Moreover, a blocking of the visual rotary member can cause visual rotation of the piston which does not appear to be linked in rotation with the cylinder in which it slides. This situation can generate an additional perturbation of the indicator as well its maladjustment. The location of the pressure gauge downstream of the shut-off valve is intended to permit verification of the state of pressure between the shut-off valve and the consumer connected to the tap, especially when it is desired to disconnect the consumer form the tap. Indeed, an improper valve shut-off at such a disconnect operation could have major consequences in terms of security. Unreliable indicator can, in these circumstances, constitute a substantial impairment of a security point of view.

The patent document GB 888,182 A discloses a pressure gauge for screwing through a wall of a pipe, tank or other. The pressure gauge operates on a similar principle to the previous document. However, it differs essentially in that the piston is not sealingly sliding in a cylinder, but actually comprises a corrugated flexible wall serving as sealing means and also of elastic means. It also differs in that the visual rotary element is supported by a ball bearing so as to ensure smooth operation without locking the indicator. This construction is therefore interesting from a reliability point of view however has disadvantages of implementation costs and bulk.

SUMMARY

The invention provides a device for controlling the flow and/or pressure for pressurized gas overcoming at least one of the above mentioned disadvantages. More particularly, the invention provides a device for controlling flow and/or pressure of pressurized gas having a substantive level of safety and reliability, in particular for gases at more than 200 bar and/or hazardous gases, as for example hydrogen, and that at a reduced cost.

The invention relates to a device for controlling flow and/or pressure of pressurized gas, comprising: a body with a gas inlet, a gas outlet and a passage connecting the inlet to the outlet; a valve shutting-off the passage; a pressure indicator in the passage downstream of the shut-off valve, the indicator comprising a sliding member subjected to the fluid pressure and to an opposing resilient force, the sliding member comprising a first position in the absence of pressure; remarkable in that the pressure indicator is configured to comprise a single second position in the presence of a pressure range of from 5 bar, e.g., 20 bar, e.g., 50 bar, to the maximum working pressure of the device.

Advantageously, the pressure indicator only works in translation.

In various embodiments, the device is a tap for a gas cylinder, with, in various implementations, a male thread at one end of the body corresponding to the gas inlet, the thread being designed to be screwed onto a gas cylinder.

According to various advantageous embodiments of the invention, the pressure indicator is configured so that the sliding member is free of rotational mechanical cooperation with another member during its sliding.

According to other advantageous embodiments of the invention, the pressure indicator comprises a body and the sliding member comprises a visual element hidden in the body in the first position of the body and emerging in the second position. The visual element moves only in translation.

According to yet other advantageous embodiments of the invention, the visual element is generally cylindrical and is slidable in an open cavity of the body of the pressure indicator.

According to yet other advantageous embodiments of the invention, the visual element is rigidly attached to the remainder of the sliding member.

According to yet other advantageous embodiments of the invention, the pressure indicator comprises a transparent cap protecting the visual element, the cap being configured to allow observation of the visual element from a lateral position to the sliding axis of the pressure indicator, the lateral position forming an angle with the sliding axis of the sliding member greater than 30°, e.g., greater than 50°, e.g., greater than 80°.

According to yet other advantageous embodiments of the invention, the pressure indicator comprises a filter directly upstream of the sliding member.

According to yet other advantageous embodiments of the invention, the filter is rigid, e.g., of sintered metallic material, e.g., of a porosity between 5 and 30 μm, e.g., between 10 and 20 μm.

According to yet other advantageous embodiments of the invention, the pressure indicator comprises a specific body attached to the device body, the filter being housed in the specific body so that the pressure indicator forms an entity.

According to yet other advantageous embodiments of the invention, the sliding member comprises a piston, the filter section being equal to or greater than the section of the piston.

According to yet other advantageous embodiments of the invention, the sliding member comprises a piston and a visual element attached, e.g., by screwing, to the piston, and the pressure indicator comprises a specific body with a through bore adapted to receiving the piston at one end of the bore, the visual element being then able to be attached to the piston at the other end of the bore.

According to yet other advantageous embodiments of the invention, the bore includes a first shoulder serving as a stop for the piston in the second position, and a second shoulder upstream of the first shoulder and of a larger diameter than the first shoulder, the second shoulder and the corresponding part of the bore receiving a filter.

According to further advantageous embodiments of the invention, the shut-off valve is manually operated, e.g., in rotation.

The shut-off valve may be a manual valve, pneumatic, electric, hydraulic or the like, or a pressure reducer providing a function of shut-off valve.

The measures of the invention provide a high level of security at a reduced cost. Indeed, the presence of only two stable positions of the pressure indicator makes it substantially simpler, cheaper and more reliable. These effects are particularly achieved by the absence of mechanical interaction, including in rotation, with another element such as a display element. The fact that the visual element of the sliding member protrudes from the body of the pressure indicator allows a substantially easier reading, especially from a lateral position. Furthermore, the presence of a filter permits to limit speed of travel of the sliding member during the opening of the valve, and thus also the mating of the shoulder surface of the piston of the sliding member and the impact noise. It also allows to further increase the reliability of the pressure indicator by preventing any jamming or locking of the sliding element by the presence of particles. The construction of the indicator is particularly advantageous especially given the reduced number of parts, ease of assembly and the fact that it can be pre-assembled as an autonomous entity that it is enough then to screw or fix to the body of a tap or of any other flow and/or pressure control device of pressurized gas.

DRAWINGS

FIG. 2 is a sectional view of the pressure indicator of the presence of pressure of the tap of FIG. 1, in accordance with various embodiments of the invention, the indicator being in the retracted position corresponding to the absence of pressure.

FIG. 3 is a sectional view of the pressure indicator of the presence of pressure of the tap of FIG. 1, in accordance with various embodiments of the invention, the indicator being in the deployed position corresponding to the presence of pressure.

DETAILED DESCRIPTION

Figure 1:
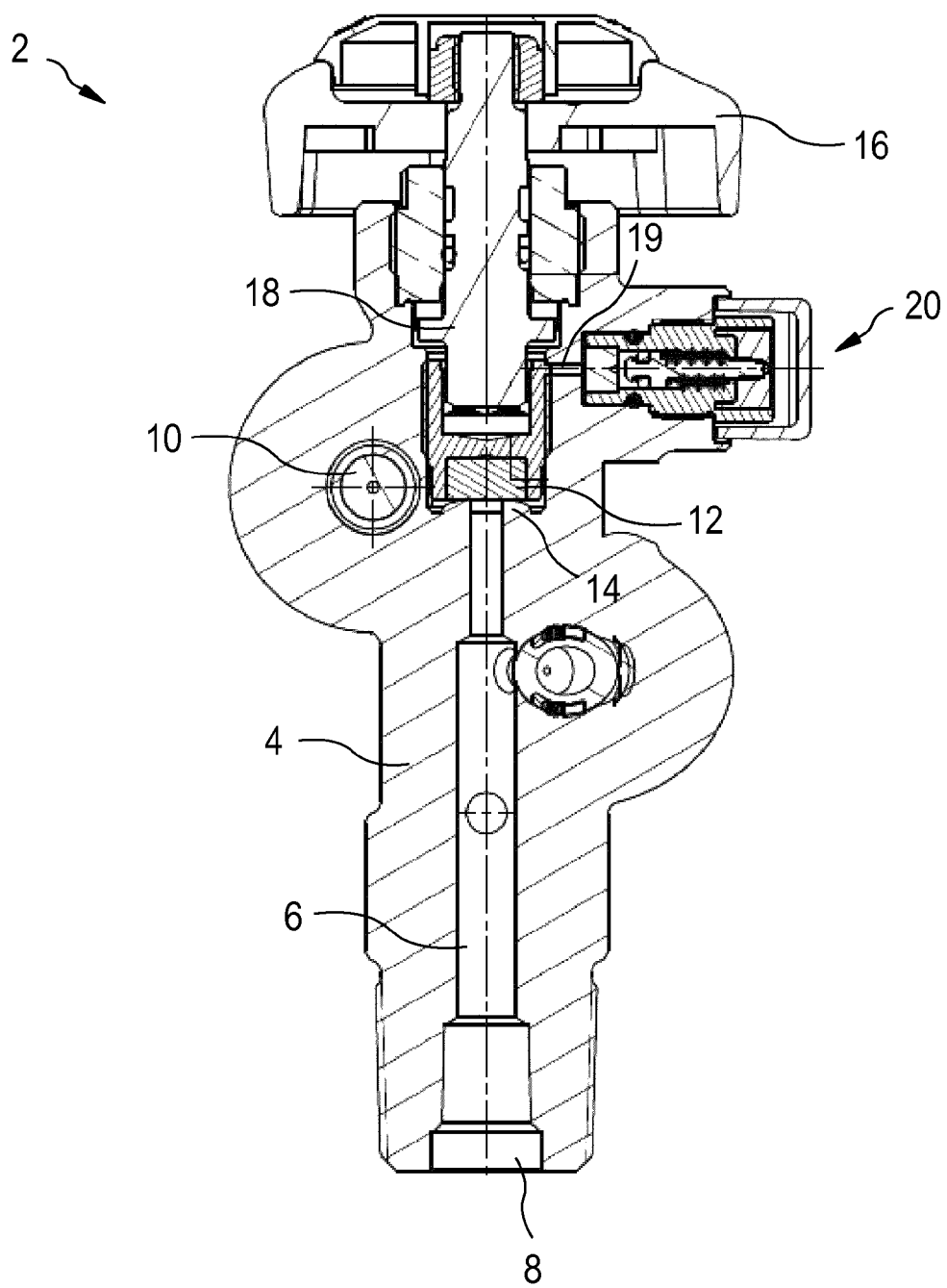
FIG. 1 is a longitudinal sectional view of a tap for a gas cylinder according to various embodiments of the invention, the tap being provided with an indicator of the presence of pressure.

FIG. 1 shows a control for controlling the flow and/or pressure of pressurized gas, more specifically, a tap 2 for a pressurized gas cylinder. The tap 2 essentially comprises a body 4 with a gas inlet 8 at a lower part and a gas outlet 10 at an upper portion or mid-height of the tap 2. The body 4 also comprises a gas passage 6 connecting the inlet 8 to the outlet 10. The tap 2 comprises a valve shutting-off the passage, the valve comprising a seat 14 traversed by the passage 6 and a movable shutter 12 driven by a rotating device. The latter is controlled by a control wheel 16 disposed at an upper part of the tap 2.

The body 4 also includes an auxiliary passage 19 providing a connection between the passage 6 downstream of the shut-off valve 12, 14 and a pressure indicator 20. The pressure indicator 20 is disposed laterally to the tap body 4.

FIG. 2 illustrates the pressure indicator 20 in greater detail. This is a sectional view of the indicator 20 in the state corresponding to no pressure, or at least when the pressure in the passage 19 (see FIG. 1) is below a limit pressure. It can be seen that the indicator 20 essentially comprises a specific body 22 intended to be attached, in particular screwed, to the tap body 2. The specific body 22 extends in a main direction corresponding to the direction of movement of a sliding member, comprising essentially a piston 26, a rod 28 and a visual element 30 for indicating the presence of pressure downstream of the shut-off valve 12, 14 (FIG. 1).

The specific body 22 of the pressure indicator includes a through bore forming a first shoulder 40 to act as a stop for the piston 26, a first cylindrical portion sealingly receiving the piston 26 by means of its seal 38, a second shoulder 42 and a second cylindrical portion for housing a rigid filter 24. The second cylindrical portion is of a larger diameter than the first cylindrical portion. The rod 28 connects the visual element 30 to the piston 26. The gas under pressure in the tap body 4, more specifically at the inlet of the pressure indicator (that is to say, on filter side), exerts a force on the piston 26 tending to move the sliding member to the right. A spring 34 housed in the bore and supported on a third shoulder 44 exerts on the piston 26 an elastic force that is opposite to that of a gas under pressure. In the absence of pressure or when the pressure is below a minimum value, such as 5, 20 or 50 bar, the sliding member 26, 28 and 30 is maintained in a stable position corresponding to a position to the left in FIG. 2 and in which the visual element 30 is at least partially, e.g., mostly, e.g., completely, embedded in the specific body 22 so as not to be visible, at least laterally.

The visual element 30 is of a generally cylindrical shape and is slidably received in a corresponding open housing on the specific body 22 of the pressure indicator 20. A transparent cap 32 covers the visual element 30 and the part of the body 22 housing the visual element 30. The cap 31 presents a bell shape.

In FIG. 3, one can observe the pressure indicator 20 in its second stable state corresponding to the presence of pressure and wherein the visual element 30 is at least partially out of the open housing of the specific body 22 and is well visible, even sideways. In this state, the gas pressure on the piston 26 exerts on the piston 26 a greater force than that of the spring 34 opposite thereto. The piston 26 is thus in abutment on the first shoulder 40 and the visual element 30 protrudes from the open housing of the specific body 22 of the indicator 20. It is also visible through the cap 32, particularly from a point of observation lateral to the longitudinal axis of the indicator 20.

In various embodiments, the visual element 30 is made of plastic material, e.g., a colored plastic material. In various implementations, the visual element 30 is connected to the rod 28 by a thread 36.

The filter 24 disposed directly upstream of the piston 26 reduces the speed of movement of the piston 26 during the opening of the shut-off valve 12, 14. In various embodiments, the filter 24 is made of sintered material with a porosity of between 5 and 30 µm, e.g., between 10 and 20 µm. This helps to protect the mechanics of the pressure indicator 20.

The pressure indicator 20 shown in FIGS. 2 and 3 is particularly easy to assemble, especially as an entity ready to be mounted on the valve body 4. Indeed, the assembly consists essentially of inserting the sub-assembly of the piston and the rod 28 and 26 with the spring 34 in the bore of the body 22. It is then sufficient to screw the visual element 30 on the rod 28 and then to introduce the filter 24 and place the cap 32. The cap 32 can however be secured directly to the body 4 of the tap 2 rather than to the specific body 22 of the pressure indicator 20.

The different main elements of the pressure indicator 20, namely the body 22, the piston 26, the rod 28 and the spring 34 are, in various embodiments, made of metallic material.

What is claimed is:

1. A flow pressure control device for pressurized gas, said device comprising:
    a body with a gas inlet, a gas outlet and a passage connecting the inlet to the outlet;
    a shut-off valve of the passage; and
    a pressure indicator in the passage downstream of the shut-off valve, the indicator comprising a sliding member subjected to fluid pressure and to an opposing resilient force, the sliding member structured and operable to have:
        a first position in the absence of pressure, and
        a single second position in the presence of a pressure range of from 5 bar to a maximum working pressure of the device;
    wherein the sliding member comprises a piston and a visual element attached to the piston, and the pressure indicator comprises a specific body with a through bore adapted to receive the piston at one end of the bore, the through bore forming a cylindrical portion sealingly receiving the piston, and the visual element being attached to the piston at the other end of the bore and wherein the pressure indicator is structured and operable so that the sliding member is free of mechanical cooperation generating rotation with another member during its sliding.

2. The device according to claim 1, wherein the sliding member is structured and operable to have the single second position in the presence of a pressure range of from 20 bar to the maximum working pressure of the device.

3. The device according to claim 1, wherein the sliding member is structured and operable to have the single second position in the presence of a pressure range of from 50 bar to the maximum working pressure of the device.

4. The device according to claim 1, wherein the visual element is at least partially hidden in the body of the pressure indicator in the first position and emerging from said body in the second position.

5. The device according to claim 1, wherein the visual element is generally cylindrical and is slidable in an open cavity of the body of the pressure indicator.

6. The device according to claim 1, wherein the visual element is rigidly connected to the sliding member.

7. The device according to claim 1, wherein the pressure indicator comprises a transparent cap protecting the visual element, the cap structured and operable to allow observation of the visual element from a lateral position to a sliding axis of the pressure indicator, the lateral position forming an angle with a sliding axis of the sliding member above 30°.

8. The device according to claim 7, wherein the lateral position forms an angle with the sliding axis of the sliding member above 50°.

9. The device according to claim 7, wherein the lateral position forms an angle with the sliding axis of the sliding member above 80°.

10. The device according to claim 1, wherein the pressure indicator comprises a filter directly upstream of the sliding member.

11. The device according to claim 10, wherein the filter is rigid.

12. The device of claim 10, wherein the filter comprises a metallic sintered material.

13. The device of claim 10, wherein the filter has a porosity of between 5 and 30 microns.

14. The device of claim 10, wherein the filter has a porosity of between 10 and 20 microns.

15. The device according to claim 10, wherein the filter is housed in the body of the pressure indicator so that the pressure indicator forms an entity.

16. The device according to claim 10, wherein a section of the filter is equal or greater than a section of the piston.

17. The device according to claim 1, wherein the bore comprises a first shoulder for abutment with the piston in the second position, and a second shoulder upstream of the first shoulder with a diameter that is greater than the diameter of the first shoulder, the second shoulder and the corresponding portion of the bore receiving a filter.

18. The device according to claim 1, wherein the shut-off valve is manually operated.

* * * * *